(12) United States Patent
Ubukata et al.

(10) Patent No.: US 9,407,143 B2
(45) Date of Patent: Aug. 2, 2016

(54) VEHICLE POWER-SUPPLY UNIT

(71) Applicant: Mitsubishi Electric Corporation, Chiyoda-ku, Tokyo (JP)

(72) Inventors: Takayuki Ubukata, Chiyoda-ku (JP); Nobuhiro Kihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 489 days.

(21) Appl. No.: 14/052,419

(22) Filed: Oct. 11, 2013

(65) Prior Publication Data

US 2014/0300179 A1    Oct. 9, 2014

(30) Foreign Application Priority Data

Apr. 9, 2013    (JP) .................................. 2013-080978

(51) Int. Cl.
*H02M 3/158*    (2006.01)
*B60L 11/18*    (2006.01)
*H02M 3/156*    (2006.01)
*B60L 11/14*    (2006.01)

(52) U.S. Cl.
CPC ............... *H02M 3/158* (2013.01); *B60L 11/14* (2013.01); *B60L 11/18* (2013.01); *H02M 3/156* (2013.01); *B60L 2210/10* (2013.01); *B60L 2270/20* (2013.01); *H02M 3/1588* (2013.01)

(58) Field of Classification Search
CPC ..... B60L 11/14; B60L 11/18; B60L 2210/10; B60L 2270/20; H02M 3/158; H02M 3/156; H02M 3/1588
See application file for complete search history.

(56) References Cited

U.S. PATENT DOCUMENTS

| 2011/0096571 A1* | 4/2011 | Usuda ................... | H02M 3/157 363/21.1 |
|---|---|---|---|
| 2012/0033454 A1* | 2/2012 | Hosotani ................. | H02M 1/34 363/21.03 |
| 2012/0316749 A1* | 12/2012 | Ubukata ................. | B60R 16/03 701/102 |

FOREIGN PATENT DOCUMENTS

JP    2007-104865 A    4/2007

* cited by examiner

*Primary Examiner* — Kenneth B Wells
*Assistant Examiner* — Rafael Pacheco
(74) *Attorney, Agent, or Firm* — Sughrue Mion, PLLC

(57) ABSTRACT

A vehicle power-supply unit has chargeable and rechargeable first power supply and second power supply connected to a voltage transducer at input and output terminals, respectively, and a switch element connected between the output terminal of the voltage transducer and the second power supply. By controlling a rector current flown through a reactor connected to at least two switching elements at one end when the voltage transducer is started, a capacitor connected between the other end of the reactor and the ground is charged, and the switch element is brought in a connection state according to a charging voltage of the capacitor and a voltage value of the second power supply. Consequently, a vehicle power-supply unit can protect the elements by preventing a rush current during a backflow and reverse connection and at start-up.

9 Claims, 8 Drawing Sheets

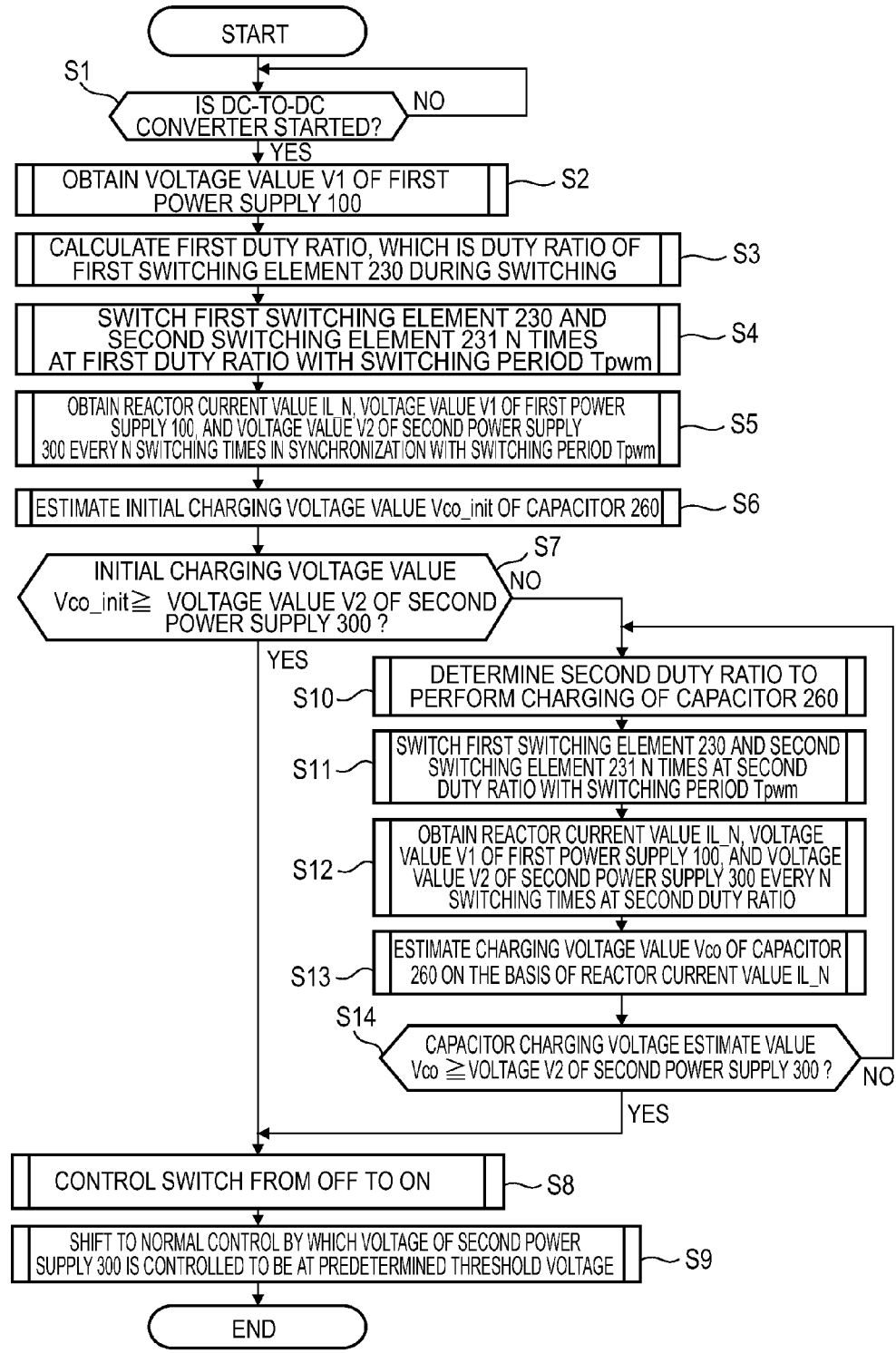

VEHICLE POWER-SUPPLY UNIT

BACKGROUND OF THE INVENTION

1. Field of the Invention

The present invention relates to a vehicle power-supply unit configured to prevent a rush current in a vehicle power-supply system since power activation till start-up.

2. Description of the Background Art

With the aim of improving fuel efficiency for a reduction of environmental burdens, there is a vehicle power-supply system requiring at least two independent power supplies to increase power generation efficiency of a generator and to use regenerative energy during deceleration. This vehicle power-supply system requires a voltage transducer to handle power supplies having different voltages and has a problem of how to prevent a rush current at start-up and protect elements from a backflow and during reverse connection.

PTL 1 discloses a system adopting a step-up DC-to-DC converter, in which protection against reverse connection is provided, and also a rush current is prevented and elements are protected by performing normal charge control by way of constant voltage control.

CITED LIST

Patent Literature

PTL 1: JP-A-2007-104865

The configuration of PTL 1, however, requires a separate control circuit to control a gate voltage because the constant current control is performed by controlling a gate voltage of a semiconductor switching element. Also, a reverse voltage is applied to a capacitor during reverse connection and an element having polarity, such as a capacitor, may possibly be damaged. It is therefore desirable to dispose an element that provides protection against a backflow and revere connection on a side closer to an output terminal than the capacitor. By disposing an element that provides protection against a backflow and revere connection on the side closer to the output terminal than the capacitor, a rush current can be prevented. However, there arises a problem that a smoothing capacitor is damaged by an overvoltage unless a capacitor charging voltage is monitored. In order to avoid this problem, means for monitoring the capacitor charging voltage is required separately.

SUMMARY OF THE INVENTION

The invention was devised to solve the problems discussed above and has an object to provide a vehicle power-supply unit capable of protecting an element from a backflow and during reverse connection and protecting an element by preventing a rush current at start-up.

A vehicle power-supply unit according to a first aspect of the invention includes a DC-to-DC converter with a chargeable and dischargeable first power supply connected to an input terminal and a chargeable and dischargeable second power supply connected to an output terminal and performing DC voltage transformation. The converter includes at least two switching elements respectively connected between the input terminal and one end of a reactor and between the one end of the reactor and a ground and operated to switch by a control circuit; a capacitor connected between the other end of the reactor and the ground; and a switch element connected between the other end of the reactor and the output terminal. The control circuit performs a sampling to obtain a voltage at the input terminal, a voltage at the output terminal, and a reactor current flown through the reactor every certain number of switching times with a predetermined switching period with which the switching elements are operated; adjusts a duty ratio of the switching elements in synchronization with the sampling; controls the switching elements to operate the certain number of switching times at a first duty ratio determined according to a voltage value at the input terminal, an inductance value of the reactor, a predetermined current value outputted from the converter, the switching period, and the certain number of switching times and then estimates an initial charging voltage value preliminarily charged to the capacitor according to the reactor current value, the voltage value at the input terminal, the first duty ratio, and the inductance value; charges the capacitor while changing a second duty ratio, which is a voltage ratio of the initial charging voltage value and the voltage value at the input terminal, by a predetermined amount at a time and estimates a charging voltage value of the capacitor during charging of the capacitor according to the reactor current value, a capacity value of the capacitor, and the switching period; and applies ON control to the switch element when the charging voltage value of the capacitor reaches a predetermined threshold value.

According to the configuration as above, by estimating a voltage preliminarily charged to the capacitor on the basis of a reactor current by performing the switching control at the first duty ratio, and by using a voltage ratio of the preliminarily charged voltage value and the input terminal voltage value as the second duty ratio, not only can a rush current from the first power supply connected to the input terminal be prevented, but also the occurrence of a backflow of energy preliminarily charged to the capacitor can be prevented. By estimating the charging voltage of the capacitor on the basis of the second duty ratio and by driving the switch element provided at the output terminal according to the charging voltage of the capacitor at the same time, it becomes possible to protect the elements from reverse connection and a backflow.

The foregoing and other objects, features, aspects, and advantages of the present invention will become more apparent from the following detailed description of the present invention when taken conjunction with the accompanying drawings.

BRIEF DESCRIPTION OF THE DRAWINGS

FIG. 2 is a flowchart depicting an operation of the vehicle power-supply unit of the first embodiment;

DESCRIPTION OF THE PREFERRED EMBODIMENTS OF THE INVENTION

Figure 1:
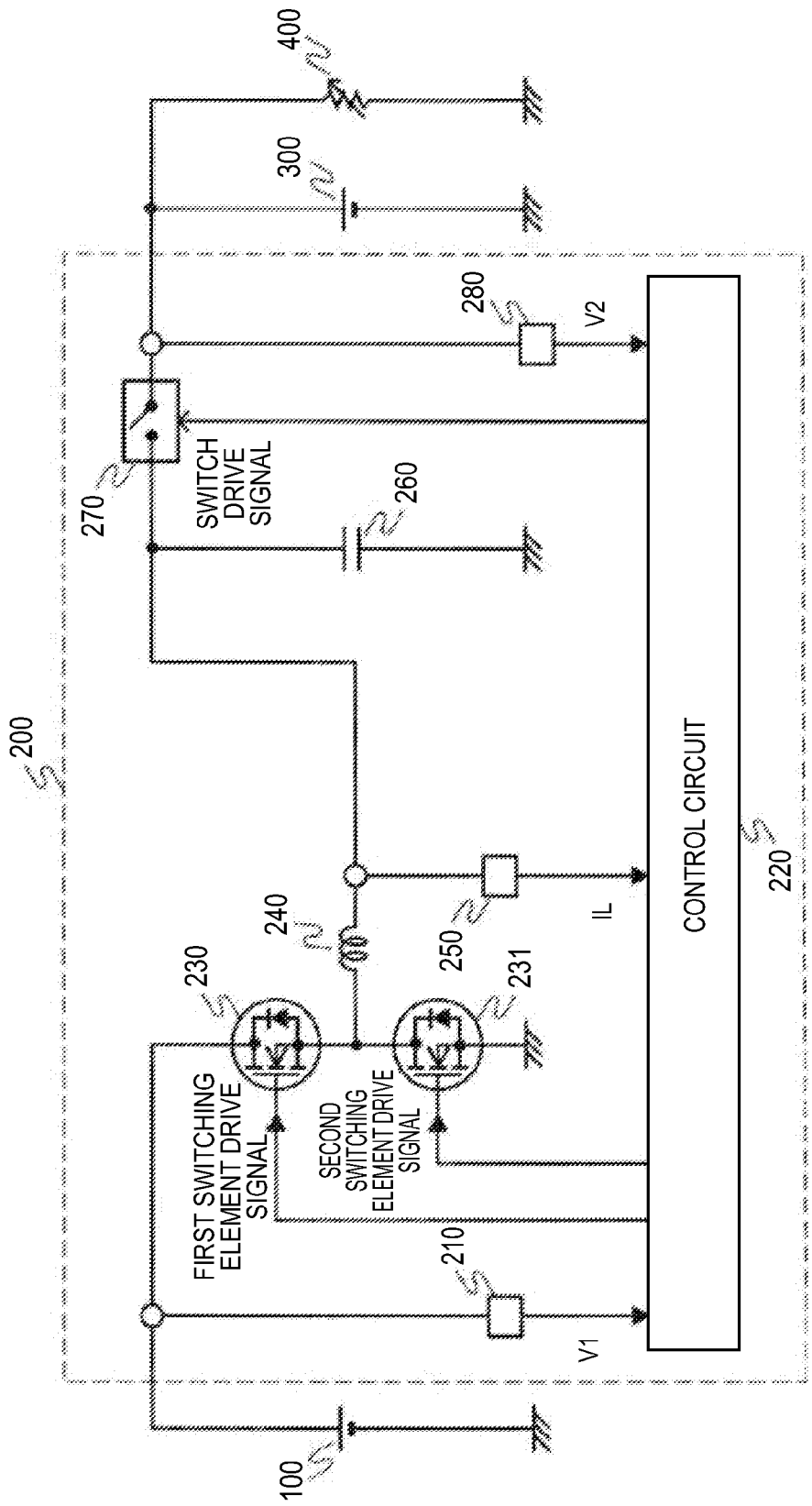
FIG. 1 is a block circuit diagram showing a configuration of a vehicle power-supply unit according to a first embodiment of the invention.

Hereinafter, embodiments of the invention will be described in detail with reference to the drawings. Same or equivalent portions are labeled with the same reference numerals in all the drawings and a description is not repeated.

First Embodiment

FIG. 1 is a view showing a configuration of a vehicle power-supply unit according to a first embodiment of the invention. A first power supply 100 of FIG. 1 is a storage cell, for example, an electric double layer capacitor or a lithium-ion battery, and is connected to a generator, such as an alternator including a rectifier and an MG (Motor Generator) (not shown in the drawing). The first power supply 100 is charged to a predetermined voltage value V1 by the generator and supplies a current to an in-vehicle electric load 400 via a voltage transducer 200. The voltage transducer 200 transforms the voltage value V1 of the first power supply 100 to a DC voltage value V2 and outputs the transformation result. A second power supply 300 is a storage cell similar to the first power supply 100, for example, a lead storage battery, and is connected to an output side of the voltage transducer 200 together with the vehicle electric load 400.

The voltage transducer 200 is, for example, a step-down DC-to-DC converter, and as is shown in FIG. 1, a plus terminal of the first power supply 100 and a plus terminal of the second power supply 300 are connected to the load 400 via a first switching element 230, a reactor 240, and a switch element 270. A drain side of the first switching element 230 is connected to the plus terminal of the first power supply 100. A source side of the first switching element 230 is connected to one end of the reactor 240 and to a drain side of the second switching element 231 a source side of which is connected to the ground. The other end of the reactor 240 is connected to one end of the switch element 270. A capacitor 260 as a smoothing portion is connected between the other end of the reactor 240 and the ground. The other end of the switch element 270 is connected to an output terminal of the voltage transducer 200. The second power supply 300 and the electric load 400 are connected to this output terminal. In the example shown in FIG. 1, the first switching element 230 and the second switching element 231 are, for example, semiconductor switching elements, such as MOSFETs. FIG. 1 shows body diodes formed in the MOSFETs. The switch element 270 can be, for example, a semiconductor switching element, such as a MOSFET and an IGBT, or an electromagnetic or mechanical relay.

Connected to the first switching element 230 and the second switching element 231 is a control circuit 220 that controls a voltage applied to a gate of each element. Switching control is applied to the first switching element 230 and the second switching element 231 according to a first switching element gate drive signal and a second switching element gate drive signal, respectively. The switching control is applied to the second switching element 231 by the control circuit 220 in a complimentary manner to the switching of the first switching element 230. In addition, a dead time for short-circuit prevention is provided during the switching of the first switching element 230 and the second switching element 231 in order to prevent a short circuit between the first power supply 100 and the ground. The switch element 270 receives an input of a switch drive signal to control disconnection and connection of the switch element 270 from the control circuit 220.

The control circuit 220 receives an input of detection values detected by: an input terminal voltage detection portion (referred to also as the first power supply voltage detection portion) 210 that detects the voltage value V1 of the first power supply 100 connected to an input terminal of the voltage transducer 200 (for example, by dividing a voltage by resistors); a reactor current detection portion 250 that detects a reactor current value IL flown through the reactor 240 (for example, by detecting a current using a shunt resistor or a current sensor); and an output terminal voltage detection portion (referred to also as the second power supply voltage detection portion) 280 that detects the voltage value V2 of the second power supply 300 connected to the output terminal of the voltage transducer 200 (for example, by dividing a voltage by resistors). These detection values are obtained by a sampling portion that is built-in the control circuit 220 and performs a sampling every N switching times in synchronization with a switching period of the first switching element 230 and the second switching element 231. According to the obtained values, control on a duty ratio at which the switching control is applied to the first switching element 230 and the second switching element 231 and ON and OFF control on the switch element 270 are performed. By adjusting the duty ratio in the predetermined period in this manner, the voltage transducer 200 transforms the voltage value V1 of the first power supply 100 to the DC voltage value V2, and controls the voltage value V2 of the second power supply 300 by outputting the transformation result.

The control flow of the voltage transducer 200 since the vehicle power-supply unit configured as above is started till the voltage value V2 of the second power supply 300 is controlled will now be described using the flowchart of FIG. 2.

In Step S1, the control circuit 220 determines whether the voltage transducer 200 is started or not. This determination is made depending on whether or not the voltage transducer 200 is started upon receipt of a start-up signal from the generator or an engine control device, for example, an ECU. When the start-up is determined, advancement is made to Step S2; otherwise, return is made to Step S1. It should be noted that the first switching element 230, the second switching element 231, and the switch element 270 are in an OFF state in Step S1.

In Step S2, the control circuit 220 obtains the voltage value V1 of the first power supply 100 detected by the input terminal voltage detection portion 210 by means of the internal sampling portion, and advances to Step S3. Subsequent Steps S3 through S6 are steps to estimate an initial charging voltage value Vco_init of the capacitor 260.

In Step S3, the control circuit 220 calculates a first duty ratio, which is a time percentage of an ON time Ton of the first switching element 230 in a predetermined switching period Tpwm, on the basis of the voltage value V1 of the first power supply 100 obtained in Step S2, and advances to Step S4.

A relation of a duty ratio when the first switching element 230 is switched with the predetermined switching period Tpwm, a variation of a reactor current, $\Delta IL$, the voltage value V1 of the first power supply 100, and a voltage value Vco of the capacitor 260 is calculated in accordance with Equation (1) below. Equation (1) below can be modified to Equation (2) below. It is understood from Equation (2) below that a variation of the reactor current, $\Delta IL$, is a maximum when the voltage Vco preliminarily charged to the capacitor 260 is 0 V.

Hence, by modifying Equation (2) below with Vco=0, Equation (3) can be obtained. A variation of the reactor current, ΔIL, expressed by Equation (3) below is a reactor current value IL flown through the reactor 240 when the switching control is applied to the first switching element 230 at the duty ratio with 0 A given as the reactor current at start-up. By modifying Equation (3) below to an equation from which to calculate a first duty ratio, which is a duty ratio of the first switching element 230 during the switching, by replacing the reactor current value IL with a predetermined current value that can be outputted or a predetermined current value IL_limit to protect the elements from an overcurrent, Equation (4) below can be obtained.

$$\Delta IL = (V1 - Vco)/L \times \text{duty ratio} \times Tpwm - Vco/L \times (1 - \text{duty ratio}) \times Tpwm \quad \text{Equation (1)}$$

$$\Delta IL = V1/L \times \text{duty ratio} \times Tpwm - Vco/L \times Tpwm \quad \text{Equation (2)}$$

$$\Delta IL = V1/L \times \text{duty ratio} \times Tpwm \quad \text{Equation (3)}$$

$$\text{First duty ratio} = IL\_limit \times L/(V1 \times Tpwm) \quad \text{Equation (4)}$$

Figure 3A:
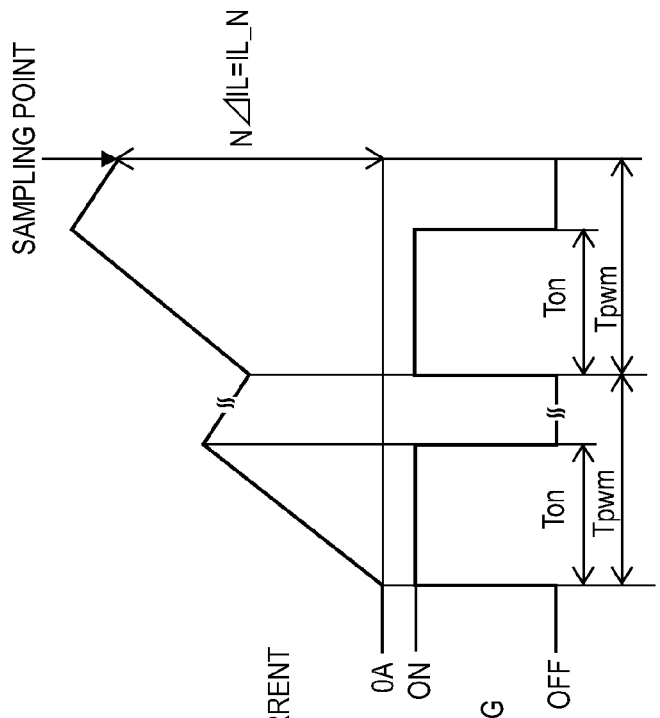
FIGS. 3A and 3B are waveform charts used to describe an operation of the vehicle power-supply unit of the first embodiment.

FIG. 3A shows a definition of the reactor current value IL flown through the reactor 240 when the switching control is applied to the first switching element 230 with 0 A given as the reactor current value IL at the start-up in Step S3. The reactor current value IL shown in FIG. 3A represents a reactor current value flown through the reactor 240 by switching the first switching element 230 with the switching period Tpwm and the ON time Ton. A point obtained by the reactor current detection portion 250 is the sampling point shown in FIG. 3A.

By modifying Equation (3) above to an equation from which to calculate a reactor current variation NΔIL that varies when the duty ratio is updated every N switching times, Equation (5) below can be obtained. The reactor current variation NΔIL expressed by Equation (5) below is a reactor current value IL_N flown through the reactor 240 when the switching control is applied to the first switching element 230 N times at the duty ratio with 0 A given as the reactor current value at start-up. By modifying Equation (5) below to an equation from which to calculate a first duty ratio, which is a duty ratio of the first switching element 230 during the switching, by replacing the reactor current value IL_N with a predetermined current value that can be outputted or a predetermined reactor current value IL_limit to protect the elements from an overcurrent, Equation (6) below can be obtained.

$$N\Delta IL = V1/L \times \text{duty ratio} \times Tpwm \times N \quad \text{Equation (5)}$$

$$\text{First duty ratio} = IL\_limit \times L/(N \times V1 \times Tpwm) \quad \text{Equation (6)}$$

Figure 3B:
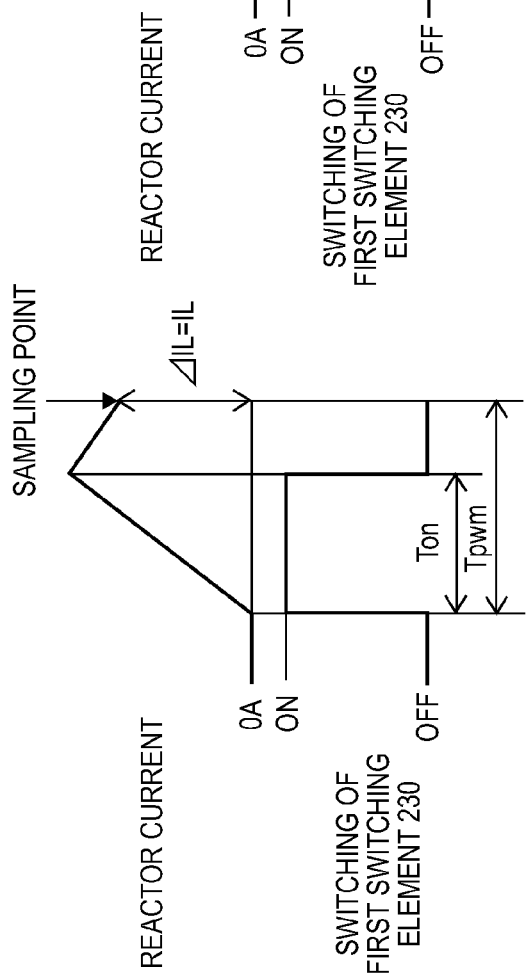

FIG. 3B shows a definition of a reactor current value IL_N flown through the reactor 240 when the switching control is applied to the first switching element 230 N times at the duty ratio with 0 A given as the reactor current value at start-up in Step S3. FIG. 3B shows a variance of the reactor current value when the switching is performed N times, and the reactor current value IL_N in the drawing represents a reactor current value that has varied when the first switching element 230 is switched N times with the switching period Tpwm and the ON time Ton. A point obtained by the reactor current detection portion 250 is a sampling point shown in FIG. 3B.

The first duty ratio of the first switching element 230 is calculated in accordance with Equation (6) above, and advancement is made to Step S4. A part in Equation (6) above, IL_limit×L/(N×Tpwm), may be calculated directly by holding values calculated in advance as fixed data. Also, an actual current increase amount is smaller than the one in Equation (6) above because the capacitor 260 is charged with a current flown due to the switching of the first switching element 230. Moreover, assume a case where the capacitor 260 is charged in advance, then even when the first switching element 230 and the second switching element 231 are controlled to switch N times at the first duty ratio calculated in accordance with Equation (6) above, the elements are not damaged by an overcurrent.

In Step S4, the control circuit 220 outputs the first switching element drive signal and the second switching element drive signal to the first switching element 230 and the second switching element 231, respectively, so that the first switching element 230 and the second switching element 231 switch with the predetermined switching period Tpwm at the first duty ratio of the first switching element 230 calculated in Step S3, and advances to Step S5.

In Step S5, the control circuit 220 obtains the voltage value V1 of the first power supply 100, the reactor current value IL_N, and the voltage value V2 of the second power supply 300, which are detection values detected by the input terminal voltage detection portion 210, the reactor current detection portion 250, and the output terminal voltage detection portion 280, respectively, when the switching is performed N switching times with the switching period Tpwm at the first duty ratio in Step S4, and advances to Step S6.

In Step S6, the control circuit 220 estimates the voltage value Vco_init preliminarily charged to the capacitor 260 on the basis of the voltage value V1 of the first power supply 100 and the reactor current value IL_N obtained in Step S5, and advances to Step S7.

By calculating a reactor current variation NΔIL flown when the switching is performed N times in accordance with Equation (1) above and Equation (2) above expressing the relation of the duty ratio of the first switching element 230 in the predetermined switching period Tpwm, the reactor current variation ΔIL, the voltage value V1 of the first power supply 100, and the voltage value Vco_init of the capacitor 260, Equation (7) below can be obtained. Further, by modifying Equation (7) to an equation from which to calculate the capacitor voltage value Vco_init preliminarily charged to the capacitor 260 as the capacitor voltage value Vco by replacing NΔIL with the reactor current value IL_N obtained by the sampling portion every N switching times with the predetermined switching period Tpwm and with 0 A given as the reactor current value at the beginning of the switching and replacing the duty ratio with the first duty ratio, Equation (8) below can be obtained.

$$N\Delta IL = N \times \Delta IL = N \times (V1/L \times \text{duty ratio} \times Tpwm - Vco/L \times Tpwm) \quad \text{Equation (7)}$$

$$Vco\_init = V1 \times \text{first duty ratio} - IL\_N \times L/(Tpwm \times N) \quad \text{Equation (8)}$$

The voltage value Vco_init preliminarily charged to the capacitor 260 is estimated in accordance with Equation (8) above in this manner, and advancement is made to Step S7. A part in Equation (8), L/(Tpwm×N), above may be calculated directly by holding values calculated in advance as fixed data. The reactor current value IL_N obtained in Step S6 is the reactor current value obtained at a sampling point same as the one specified in Step S3.

In Step S7, a determination is made as to whether the voltage value Vco_init preliminarily charged to the capacitor 260 estimated in Step S6 is equal to or greater than a predetermined threshold value. When the voltage value Vco_init is equal to or greater than the predetermined threshold value, advancement is made to Step S8. On the other hand, when the voltage value Vco_init is less than the predetermined threshold value, advancement is made to Step S10.

In Step S8, the control circuit 220 connects the output terminal of the voltage transducer 200 and the reactor 240 by switching ON the switch element 270, and advances to Step S9.

In Step S9, the control circuit 220 performs voltage control by which the voltage value V2 of the second power supply 300 is controlled to be a predetermined voltage value. For example, given the predetermined voltage value as a target voltage value, then, according to a deviation from the voltage value V2 of the second power supply 300, the duty ratio is adjusted by current mode control by which the reactor current is controlled. In Step S9, voltage mode control by which the duty ratio is determined on the basis of a deviation between the target voltage value and the voltage value V2 of the second power supply 300 may be adopted instead of the current mode control described above. That is, a method of determining the duty ratio is not limited to the method described above.

In Step S10, because the voltage value Vco_init preliminary charged to the capacitor 260 estimated in Step S6 is less than the predetermined threshold value, the control circuit 220 determines a second duty ratio at which the first switching element 230 and the second switching element 231 are switched with the predetermined switching period Tpwm to charge the capacitor 260.

Herein, the second duty ratio determined in Step S10 is a voltage ratio of the voltage value Vco_init preliminarily charged to the capacitor 260 estimated in Step S6 and the voltage value V1 of the first power supply 100 obtained in Step S5. By using a voltage ratio of Vco_init and V1 as the second duty ratio, it becomes possible to prevent a backflow from the capacitor 260 and a rush current flowing from the first power supply 100 connected on the input side at the beginning of the switching. In a case where advancement is made from Step S14 described below to Step S10, the second duty ratio is determined so that the second duty ratio is increased gradually by a predetermined amount set in advance at a time.

In Step S11, the first switching element 230 and the second switching element 231 are switched N times at the second duty ratio determined in Step S10 with the predetermined switching period Tpwm, and advancement is made to Step S12.

In Step S12, the control circuit 220 obtains the reactor current value IL_N, the voltage value V1 of the first power supply 100 (input terminal), and the voltage value V2 of the second power supply 300 (output terminal), which are detection values detected by the input terminal voltage detection portion 210, the reactor current detection portion 250, and the output terminal voltage detection portion 280, respectively, when the switching is performed N times with the switching period Tpwm at the second duty ratio in Step S11, and advances to Step S13.

In Step S13, the control circuit 220 estimates the charging voltage value Vco of the capacitor 260 on the basis of the reactor current value IL_N obtained in Step S12, and advances to Step S14.

Herein, to express a relation of the charging voltage value Vco of the capacitor 260 and a current I flowing to the capacitor 260, a relational expression of a variance dv of a charging voltage of a capacitor having a capacity C with respect to a current I flowing to the capacitor over a given time dt is expressed as Equation (8) below. By modifying Equation (8) below by replacing the given time dt with the switching period Tpwm, the current I with the reactor current value IL, and the variance dv with a variation of the capacitor voltage, $\Delta Vco$, Equation (9) below can be obtained. By modifying Equation (9) below to an equation from which to calculate a variation of the capacitor voltage, $\Delta Vco$, of the capacitor having the capacity C, Equation (10) can be obtained.

$$I = C \times dv/dt \qquad \text{Equation (8)}$$

$$IL = C \times \Delta Vco/Tpwm \qquad \text{Equation (9)}$$

$$\Delta Vco = IL \times Tpwm/C \qquad \text{Equation (10)}$$

For a case where the duty ratio is updated every N switching times, Equation (10) above is modified to an equation from which to calculate $\Delta Vco\_n$ as $\Delta Vco$ by replacing the reactor current value IL in Equation (10) above with a reactor current value IL_N sampled every N switching times in synchronization with the predetermined switching period Tpwm. Then, Equation (11) below can be obtained. Further, by modifying Equation (11) below to an equation from which to calculate the charging voltage value Vco of the capacitor 260 using the voltage value Vco_init preliminarily charged to the capacitor 260 estimated in Step S6, Equation (12) below can be obtained.

$$\Delta Vco\_n = \Delta Vco \times N = IL\_N \times Tpwm \times N/C \qquad \text{Equation (11)}$$

$$Vco = Vco\_\text{init} + \Delta Vco\_n = Vco\_\text{init} + IL\_N \times Tpwm \times N/C \qquad \text{Equation (12)}$$

The reactor current values IL and IL_N in Equation (9) through Equation (12) above used to calculate the charging voltage value Vco of the capacitor 260 in Step S13 are average values obtained in a filter portion, that is, an average value when the switching is performed with the switching period Tpwm and an average value of the reactor currents when switching is performed N times with the switching period Tpwm, respectively. Also, the reactor current value obtained in Step S12 does not depend on the sampling timing. In Step S6 in which the reactor current values defined in FIG. 3A and FIG. 3B are used, a preliminarily averaged current value may be used and a value calculated in accordance with Equation (8) above may be corrected later. Hence, the configuration is not limited to the one described in the first embodiment.

In this manner, the control circuit 220 calculates the charging voltage value Vco of the capacitor 260 in accordance with Equation (12) above on the basis of the voltage value Vco_init preliminarily charged to the capacitor 260 estimated in Step S6, the reactor current value IL_N obtained in Step S12, and the capacity value C of the capacitor 260, and advances to Step S14. A part in Equation (12) above, Tpwm×N/C, may be calculated directly by holding values calculated in advance as fixed data.

In a case where advancement is made to Step S13 from Step S14 described below by way of Step S10, the charging voltage value Vco of the capacitor 260 estimated in Step S13 by way of Steps S10 through S13 described above is expressed as Equation (13) below. Herein, Vco_old is the charging voltage value of the capacitor 260 calculated in Step S13 last time. The charging voltage value Vco of the capacitor 260 is calculated by summing and integrating a value of the variation of the charging voltage, $\Delta Vco\_n$, of the capacitor 260 calculated in Step S13 this time, and advancement is made to Step S14.

$$Vco = Vco\_\text{old} + \Delta Vco\_n = Vco\_\text{old} + IL\_N \times Tpwm \times N/C \qquad \text{Equation (13)}$$

In Step S14, a determination is made on the charging voltage value Vco of the capacitor 260 estimated in Step S13 in the same manner as in Step S7. When the charging voltage value Vco of the capacitor 260 is equal to or greater than the predetermined threshold value, advancement is made to Step S8. On the other hand, when the charging voltage value Vco of the capacitor 260 is less than the predetermined threshold value, return is made to Step S10 and the charge control of the capacitor 260 is continued by gradually increasing the second duty ratio.

In the first embodiment, by performing the charge control by estimating the charging voltage value Vco of the capacitor 260 on the basis of the reactor current value, not only can a detection portion of the charging voltage value of the capacitor 260 be omitted, but also a rush current can be prevented, the elements can be protected during reverse connection and a backflow, and a processing load can be lowered by performing the control independently of the sampling period.

Second Embodiment

Figure 4:
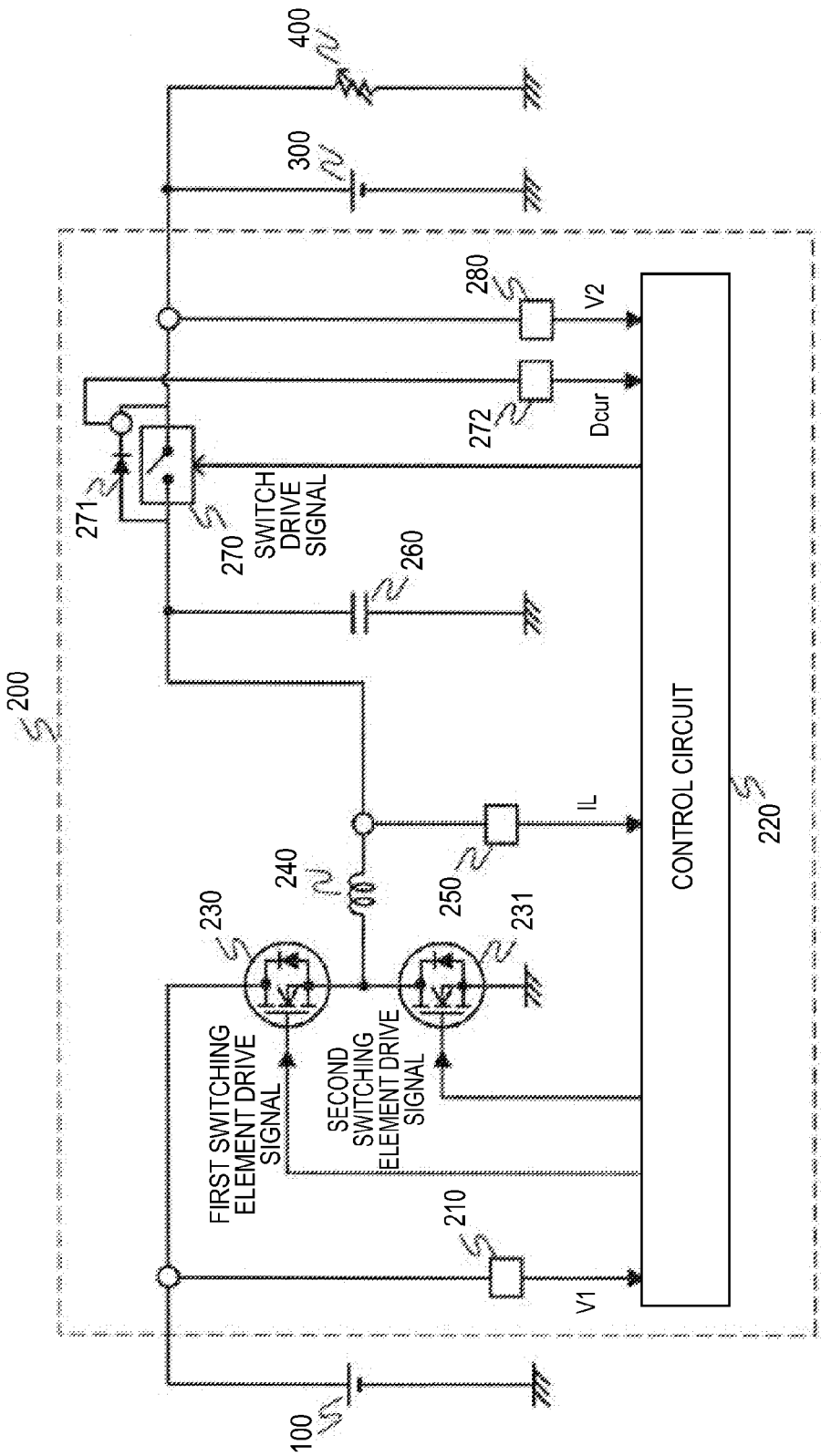
FIG. 4 is a block circuit diagram showing a configuration of a vehicle power-supply unit according to a second embodiment of the invention.

FIG. 4 is a view showing a configuration of a vehicle power-supply unit according to a second embodiment of the invention. Differences from FIG. 1 are that a diode 271 disposed with its anode on the side of the reactor 240 and its cathode on the output terminal side of the voltage transformer 200 is connected in parallel with the switch element 270 and that a diode current detection portion 272 that detects a current flown through the diode 271 is provided. The rest is the same as the configuration of FIG. 1.

Figure 5:
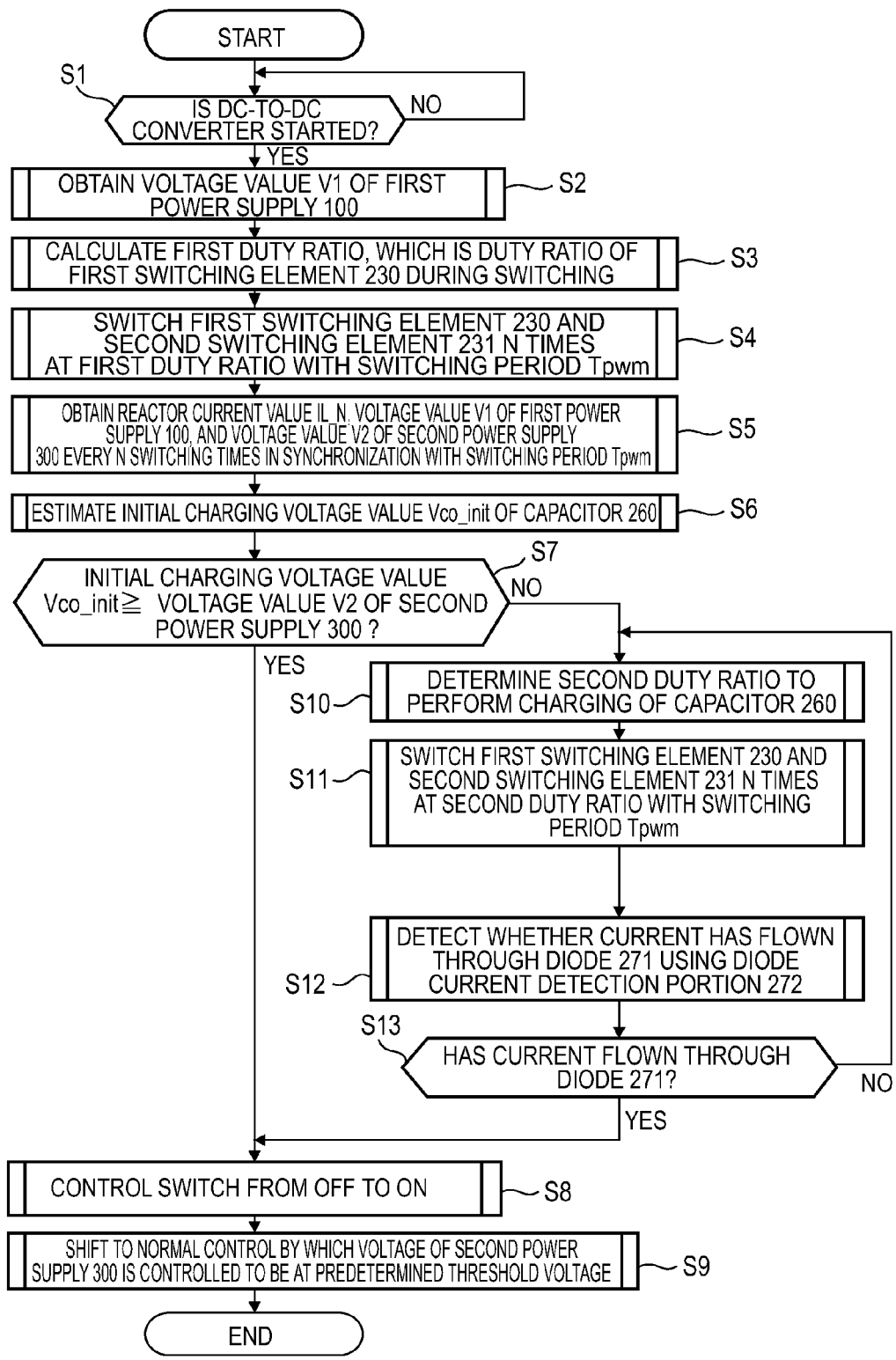
FIG. 5 is a flowchart depicting an operation of the vehicle power-supply unit of the second embodiment.

The control flow of the voltage transducer 200 since the vehicle power-supply unit configured as in FIG. 4 is started till the voltage value V2 of the second power supply 300 is controlled will be described using the flowchart of FIG. 5. Contents of Step S1 through Step S11 in the flowchart of FIG. 5 are the same as the contents of Step S1 through Step S11 in the flowchart of the first embodiment depicted in FIG. 2, and a description of these steps is omitted herein. Hereinafter, Step S12 and the subsequent step in FIG. 5 will be described.

In Step S12, a diode current value Dcur flown through the diode 271 connected in parallel with the switch element 270 is detected by the diode current detection portion 272, and advancement is made to Step S13. Because a current starts to flow through the diode 271 when a charging voltage of the capacitor 260 reaches or exceeds a sum of the voltage value V2 of the second power supply 300 and a breakdown voltage of the diode 271, it is determined in Step S12 that a current has flown through the diode 271 when the diode current value Dcur is 0 A or higher. In Step S12, a detection is made to determine whether a current has flown through the diode 271. Hence, a sampling may be performed at the same timing with the sampling portion that samples the reactor current value when the switching is performed N times with the switching period Tpwm. That is, a manner of current detection is not limited to the manner described above.

In Step S13, a determination is made as to whether the charging of the capacitor 260 is completed depending on whether a current has flown through the diode 271. In a case where it is detected that a current has flown through the diode 271 in preceding Step S12, advancement is made to Step S8; otherwise, return is made to Step S10.

The second embodiment is configured in such a manner that the diode 271 is disposed in close proximity to the diode current detection portion 272. However, a current flowing into the second power supply 300 from the voltage transducer 200 used to manage a state of charge (SOC) of the second power supply 300 connected to the output terminal of the voltage transducer 200 may be used instead of the diode current value Dcur to make a determination as to whether a current has flown through the diode 271. Hence, the diode current detection portion 272 is not limited to the one described in the second embodiment. In addition, the switch element 270 and the diode 271 may be semiconductor switch elements, such as a MOSFET forming a body diode therein.

In the second embodiment, a determination in the first embodiment above as to whether the charging of the capacitor 260 to switch ON the switch element 270 is completed is made by determining whether or not a current has flown through the diode 271 connected in parallel with the switch element 270. In the second embodiment, because it is not necessary to estimate a charging voltage value of the capacitor 260, a processing load, for example, when the control circuit 220 performs a computation, can be reduced.

Third Embodiment

Figure 6:
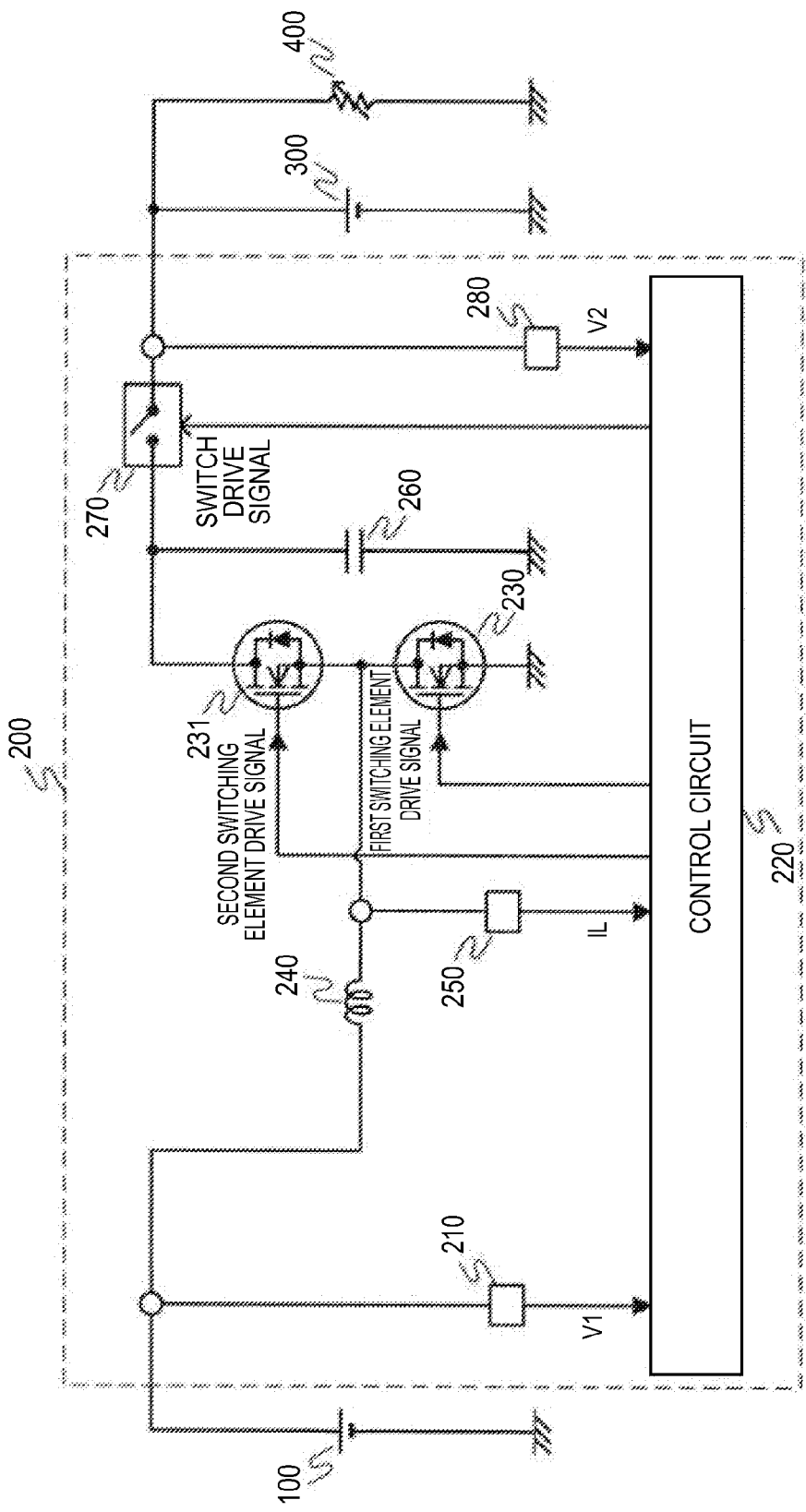
FIG. 6 is a block circuit diagram showing a configuration of a vehicle power-supply unit according to a third embodiment of the invention.

FIG. 6 is a view showing a configuration of a vehicle power-supply unit according to a third embodiment of the invention. In this configuration, the voltage transducer 200 of the first embodiment shown in FIG. 1 is changed to a step-up DC-to-DC converter.

In the voltage transducer 200 of the third embodiment, the plus terminal of the first power supply 100 and the plus terminal of the second power supply 300 are connected via the reactor 240, the second switching element 231, and the switch element 270. The plus terminal of the first power supply 100 is connected to one end of the reactor 240 and the drain side of the first switching element 230 the source side of which is connected to the ground is connected to the other end of the reactor 240. The source side of the second switching element 231 is connected to the other end of the reactor 240 and the drain side of the second switching element 231 is connected to one end of the switch element 270. Further, the other end of the capacitor 260 one end of which is grounded is connected to the drain side of the second switching element 231. The other end of the switch element 270 is connected to the output terminal of the voltage transducer 200. The second power supply 300 and the electric load 400, such as lead storage batteries, are connected to the output terminal. In the example shown in FIG. 6, as with the example of FIG. 1, the first switching element 230 and the second switching element 231 are, for example, semiconductor switching elements, such as MOSFETs. FIG. 6 shows body diodes formed in the MOSFETs. Also, as with the example of FIG. 1, the switch element 270 can be a semiconductor switching element, such as a MOSFET and an IGBT, or an electromagnetic or mechanical relay.

Constituent components of FIG. 6 of the third embodiment are the same as those of FIG. 1 and connections of the respective components are different as described above. The control circuit 220 is connected to the first switching element 230 and the second switching element 231. The control circuit 220 applies the switching control to the first switching element 230 and the second switching element 231 according to a first switching element gate drive signal and a second switching element gate drive signal, respectively. The switching control is applied to the second switching element 231 by the control circuit 220 in a complimentary manner to the switching of the first switching element 230. In addition, a dead time for short-circuit prevention is provided during the switching of the first switching element 230 and the second switching element 231 in order to prevent a short circuit between the first power supply 100 and the ground. The switch element 270 receives an input of a switch drive signal to control disconnection and connection of the switch element 270 from the control circuit 220. The control circuit 220 transforms the voltage value V1 of the first power supply 100 to the DC voltage value V2 by adjusting a duty ratio in a predetermined period according to the voltage value V1 of the first power supply 100, the reactor current value IL, and the voltage value V2 of the second power supply 300 detected by the detection portions 210, 250, 280, respectively, and sampled by the sampling portion same as the corresponding portions in the first embodiment above, and controls the voltage value V2 of the second power supply 300 by outputting the transformation result.

The control flow of the voltage transducer 200 since the vehicle power-supply unit configured as above is started till the voltage value V2 of the second power supply 300 is controlled will now be described.

In comparison with the configuration of the first embodiment above in which the voltage transducer 200 is a step-down DC-to-DC converter, the voltage transducer 200 of the third embodiment is different merely in that it is a step-up DC-to-DC converter. Hence, of the control flow of the first embodiment above depicted in FIG. 2, a description of the control flow will be given only to Step S3, Step S6, ad Step S13, which are differences accompanying a change from the step-down DC-to-DC converter to the step-up DC-to-DC converter and a description of Step S1 and Step S2 in the control flow of FIG. 2 is omitted herein.

Steps S3 through S6 in the control flow of the third embodiment are the steps to estimate the initial charging voltage value Vco_init of the capacitor 260 as with the control flow of the first embodiment above.

In Step S3, the control circuit 220 calculates a first duty ratio, which is a time percentage of an ON time Ton of the first switching element 230 in the predetermined switching period Tpwm, on the basis of the voltage value V1 of the first power supply 100 obtained in Step S2, and advances to Step S4.

The capacitor 260 is charged in advance from the first power supply 100 connected to the input terminal of the voltage transducer 200 via the body diode connected in parallel with the second switching element 231. Accordingly, the initial charging voltage value Vco_init of the capacitor 260 is a voltage value that does not drop below the voltage value V1 of the first power supply 100. However, the initial charging voltage value Vco_init may possibly take a voltage value greater than the voltage value V1. It is therefore necessary to estimate the initial charging voltage value Vco_init.

A relation of the duty ratio at which the first switching element 230 is switched with the predetermined switching period Tpwm, a variation of the reactor current, ΔIL, the voltage value V1 of the first power supply 100, and the voltage value Vco of the capacitor 260 is expressed as Equation (14) below. As has been described in Step S3 above, the voltage value Vco is a voltage value equal to or greater than the voltage value V1. Hence, by modifying Equation (14) below by assuming that the voltage value Vco is equal to the voltage value V1, which is a minimum, Equation (15) below can be obtained. The reactor current variation ΔIL expressed by Equation (15) below is a reactor current value IL flown through the reactor 240 when the switching control is applied to the first switching element 230 at the duty ratio with 0 A given as the reactor current value at start-up. By modifying Equation (15) below to an equation from which to calculate a first duty ratio, which is the duty ratio of the first switching element 230 during the switching to charge the capacitor 260, by replacing the reactor current value IL with a predetermined current value that can be outputted or a predetermined current value IL_limit to protect the elements from an overcurrent, Equation (16) below can be obtained.

$$\Delta IL = V1/L \times \text{duty ratio} \times Tpwm - (Vco - V1)/L \times (1-\text{duty ratio}) \times Tpwm \quad \text{Equation (14)}$$

$$\Delta IL = V1/L \times \text{duty ratio} \times Tpwm \quad \text{Equation (15)}$$

$$\text{First duty ratio} = IL\_\text{limit} \times L/(V1 \times Tpwm) \quad \text{Equation (16)}$$

By modifying Equation (15) above to an equation from which to calculate a reactor current value NΔIL that varies when the duty ratio is updated every N switching times, Equation (17) below can be obtained.

Herein, NΔIL expressed by Equation (17) below is a reactor current value IL_N obtained by the sampling portion every N switching times with the predetermined switching period Tpwm with 0 A given as the reactor current value at the beginning of the switching. By modifying Equation (17) to an equation from which to calculate a first duty ratio, which is a duty ratio of the first switching element 230, by replacing the reactor current value NΔIL with a predetermined current value that can be outputted or a predetermined current value IL_limit to protect the elements from an overcurrent and replacing the duty ratio with the first duty ratio, Equation (18) below can be obtained.

$$N\Delta IL = N \times V1/L \times \text{duty ratio} \times Tpwm \quad \text{Equation (17)}$$

$$\text{First duty ratio} = IL\_\text{limit} \times L/(N \times V1 \times Tpwm) \quad \text{Equation (18)}$$

The first duty ratio, which is a percentage of the ON time Ton of the first switching element 230 in the predetermined switching period Tpwm, is calculated in accordance with Equation (18) above, and advancement is made to Step S4. A part in Equation (18) above, IL_limit×L/(N×Tpwm), may be calculated directly by holding values calculated in advance as fixed data. Also, an actual current increase amount is smaller than the one in Equation (20) below because the capacitor 260 is charged due to the switching. Hence, even when the first switching element 230 and the second switching element 231 are controlled to switch N times at the first duty ratio, the elements are not damaged by an overcurrent.

Steps S4 and S5 are the same as those in the control flow in the FIG. 2 of the first embodiment above, and a description of these steps is omitted herein.

In Step S6, the control circuit 220 estimates the voltage value Vco_init preliminarily charged to the capacitor 260 on the basis of the voltage value V1 of the first power supply 100 and the reactor current value IL_N obtained in Step S5, and advances to Step S7.

By calculating the reactor current variation NΔIL flown when the switching is performed N times in accordance with Equation (14) above expressing the relation of the duty ratio of the first switching element 230 with the predetermined switching period Tpwm, the reactor current variation ΔIL, the voltage value V1 of the first power supply 100, and the voltage value Vco_init of the capacitor 260, Equation (19) below can be obtained. Further, by modifying Equation (19) below to an equation from which to calculate the capacitor voltage value Vco_init preliminarily charged to the capacitor 260 as the capacitor voltage value Vco by replacing NΔIL with the reactor current value IL_N obtained by the sampling portion every N switching times with the predetermined switching period Tpwm with 0 A given as the reactor current at the beginning of the switching and replacing the duty ratio with first duty ratio, Equation (20) below can be obtained.

$$N\Delta IL = N \times \Delta IL = N \times (V1/L \times \text{duty ratio} \times Tpwm - (Vco - V1)/L \times (1-\text{duty ratio}) \times Tpwm) \quad \text{Equation (19)}$$

$$Vco\_init = V1/(1-\text{first duty ratio}) - IL\_N \times L/((1-\text{first duty ratio}) \times Tpwm \times N) \quad \text{Equation (20)}$$

The voltage value Vco_init preliminarily charged to the capacitor 260 is estimated in accordance with Equation (20) above in this manner, and advancement is made to Step S7. A part in Equation (20) above, L/(Tpwm×N), may be calculated directly by holding values calculated in advance as fixed data. The reactor current value IL_N obtained in Step S6 is the reactor current value at a sampling point same as the one specified in Step S3 in the control flow of the first embodiment above shown in FIG. 2.

Steps S7 through S12 are the same as those in the control flow in FIG. 2 of the first embodiment above, and a description of these steps is omitted herein.

In Step S13, the charging voltage value Vco of the capacitor 260 is estimated on the basis of the reactor current value IL_N obtained in Step S12, and advancement is made to Step S14.

To express a relation of the charging voltage value Vco of the capacitor 260 and a current I flowing into the capacitor 260, a relational expression of a variance dv of a charging voltage of a capacitor having a capacity of C with respect to a current I flown into the capacitor over a given time dt is expressed as Equation (21) below. A current flows into the capacitor 260 only during an OFF time Toff of the first switching element 230, that is, an inverse of the first duty ratio, which is a time percentage of the ON time Ton in the switching period Tpwm. By replacing the current I with the reactor current value IL, the variance dv with a variation of the capacitor voltage, $\Delta$Vco, and the given time dt with the time Toff, Equation (22) below can be obtained. By modifying Equation (22) below to an equation from which to calculate a variation of the capacitor voltage, $\Delta$Vco, of the capacitor having a capacitor C and to calculate the time Toff on the basis of the second duty ratio and the switching period Tpwm, Equation (23) below can be obtained.

$$I = C \times dv/dt \quad \text{Equation (21)}$$

$$IL = C \times \Delta Vco/\text{Toff} \quad \text{Equation (22)}$$

$$\Delta Vco = IL \times (1 - \text{second duty ratio}) \times Tpwm/C \quad \text{Equation (23)}$$

For a case where the duty ratio is updated every N switching times, Equation (23) above is modified to an equation from which to calculate $\Delta$Vco_n by replacing the reactor current value IL in Equation (23) above with the reactor current value IL_N sampled every N switching times in synchronization with the predetermined switching period Tpwm and replacing $\Delta$Vco with the $\Delta$Vco_n. Then, Equation (24) below can be obtained. By further modifying Equation (24) below to an equation from which to calculate the charging voltage value Vco of the capacitor 260 on the basis of the voltage value Vco_init preliminarily charged to the capacitor 260 estimated in Step S6, Equation (25) below can be obtained.

$$\Delta Vco\_n = \Delta Vco \times N = IL\_N \times (1 - \text{second duty ratio}) \times Tpwm \times N/C \quad \text{Equation (24)}$$

$$Vco = Vco\_init + \Delta Vco\_n = Vco\_init + IL\_N \times (1 - \text{second duty ratio}) \times Tpwm \times N/C \quad \text{Equation (25)}$$

The reactor current values IL and IL_N in Equations (22) through (25) above used to calculate the charging voltage value Vco of the capacitor 260 in Step S13 are the reactor current during the OFF time Toff of the first switching element 230 when the switching is performed with the switching period Tpwm at the second duty ratio, and take the current value obtained at a sampling timing same as the one in Step S6 in the first and second embodiments above. As has been depicted in Step S13 of the first embodiment above, a preliminarily averaged current value may be used for the reactor current and the value calculated in accordance with Equation (25) above may be corrected later. Hence, the configuration is not limited to the one described herein.

In this manner, the charging voltage value Vco of the capacitor 260 is calculated in accordance with Equation (25) above on the basis of the voltage value Vco_init preliminarily charged to the capacitor 260 estimated in Step S6, the reactor current value IL_N obtained in Step S12, and the capacitor C of the capacitor 260, and advancement is made to Step S14. A part in Equation (25) above, Tpwm×N/C, may be calculated directly by holding values calculated in advance as fixed data. In a case where advancement is made to Step S13 from Step S14 by way of Step S10, the charging voltage value Vco of the capacitor 260 estimated in Step S13 by way of Steps S10 through S13 is expressed as Equation (26) below. Herein, Vco_old is a charging voltage value of the capacitor 260 calculated in Step S13 last time. The charging voltage value Vco of the capacitor 260 is calculated by summing and integrating a value of the charging voltage variation $\Delta$Vco_n of the capacitor 260 calculated in Step S13 this time, and advancement is made to Step S14.

$$Vco = Vco\_old + \Delta Vco\_n = Vco\_old + IL\_N \times (1 - \text{second duty ratio}) \times Tpwm \times N/C \quad \text{Equation (26)}$$

The above has described the control flow of the third embodiment in a portion different from the control flow of the first embodiment above shown in FIG. 2.

As has been described, the third embodiment is of the same configuration as the first embedment above except that the voltage transducer 200 is a step-up DC-to-DC converter. Hence, by performing the charge control by estimating the charging voltage value Vco of the capacitor 260 on the basis of the reactor current value, not only can a detection portion of the charging voltage value of the capacitor 260 be omitted, but also a rush current can be prevented, the elements can be protected during reverse connection and a backflow, and a processing load can be lowered by performing the control independently of the sampling period.

Fourth Embodiment

Figure 7:
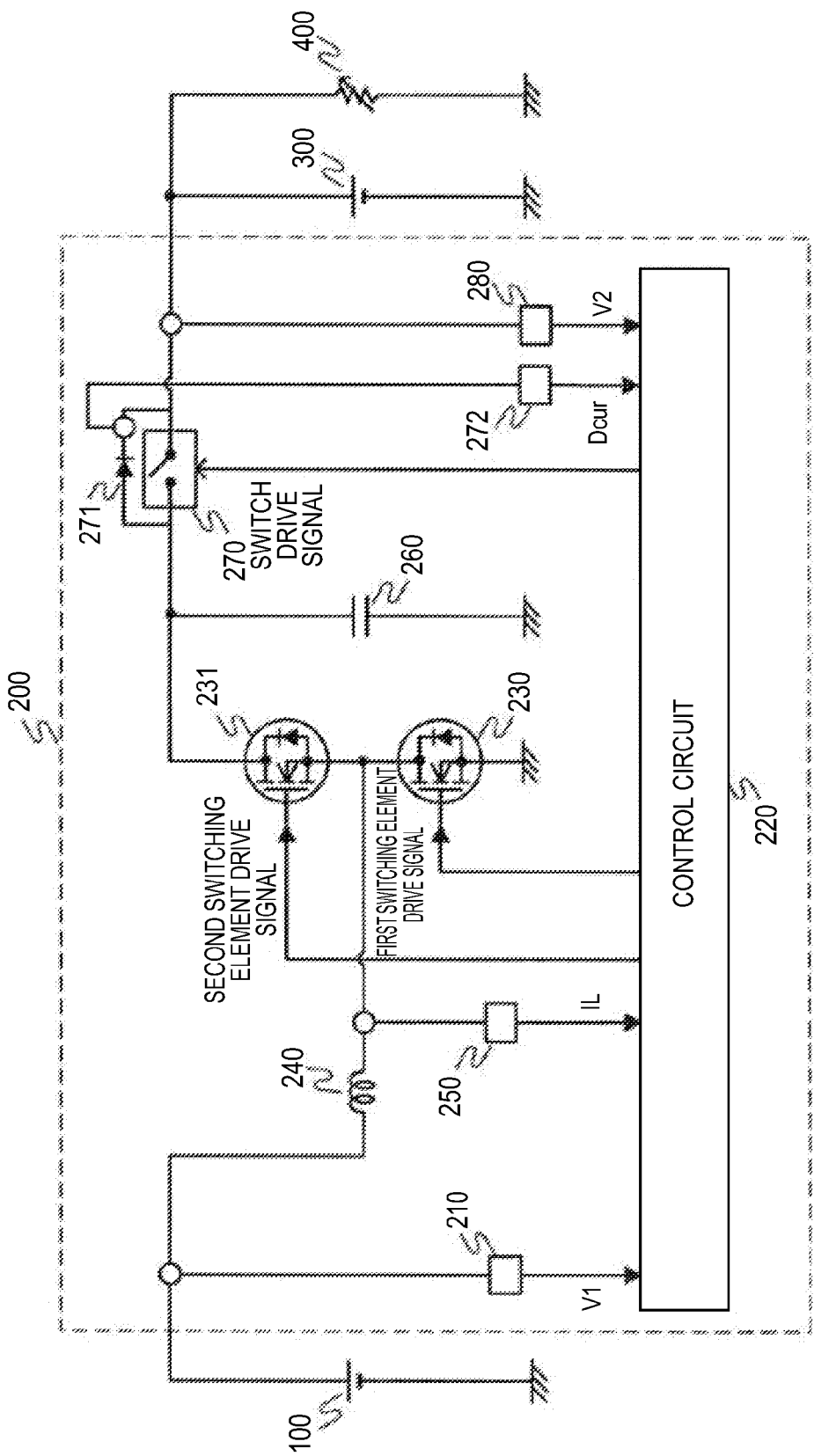
FIG. 7 is a block circuit diagram showing a configuration of a vehicle power-supply unit according to a fourth embodiment of the invention.

FIG. 7 is a view showing a configuration of a vehicle power-supply unit according to a fourth embodiment of the invention, in which the voltage transducer 200 of the second embodiment shown in FIG. 4 is changed to a step-up DC-to-DC converter.

The voltage transducer 200 of FIG. 7 is the same as the counterpart of the third embodiment above and a portion of the switch element 270 is the same as the counterpart of the second embodiment above. A detailed description of the configuration is therefore omitted herein.

The control flow of the fourth embodiment is the same as the control flow of the second embodiment in FIG. 5 and a description of the control flow is omitted herein. Also, Step S3 and Step S6, which are the steps involved with a change of the voltage transducer 200 from the step-down DC-to-DC converter of the second embodiment above to the step-up DC-to-DC converter in the fourth embodiment, are the same as Step S3 and Step S6, respectively, described in the third embodiment above. Hence, a description of these steps is omitted herein, too.

As has been described, the fourth embodiment is configured in such a manner that the voltage transducer 200 is a step-up DC-to-DC converter and, as with the second embodiment above, whether the charging of the capacitor 260 is completed is determined depending on whether a current flows through the diode 271 connected in parallel with the switch element 270. In the fourth embodiment, it is not necessary to estimate the charging voltage value of the capacitor 260 and therefore a processing load, for example, when the control circuit 220 performs a computation, can be reduced.

Fifth Embodiment

A fifth embodiment is configured to control a predetermined amount by which the second duty ratio is changed in Step S10 in the first through fourth embodiments is controlled on the basis of the reactor current value IL.

Herein, a predetermined current value IL_limit that can be outputted from the voltage transducer 200 is given as the target current value, then the charge control is applied to the capacitor 260 while a reactor current value IL_N is controlled by controlling the second duty ratio on the basis of the reactor current value IL_N obtained by the sampling portion. The charge control in this instance can adopt a method of controlling the reactor current by feedback control or feed-forward control, such as PID control and PI control, and the method is not limited to the one described above. The switching is performed N switching times according to the duty ratio determined on the basis of the reactor current value by the control described above, and advancement is made to Step S11.

The subsequent steps are the same as those in the first through fourth embodiments above, and a description of these steps is omitted herein. According to the fifth embodiment, because the capacitor 260 is charged while the reactor current is controlled, the charging of the capacitor 260 can be completed faster than in the first through fourth embodiments above.

Sixth Embodiment

A sixth embodiment is configured in such a manner that a diode current detection, by which a current flown through the diode 271 is detected in Steps S12 and S13 of the second embodiment and the fourth embodiment above, is determined according to a variation of the reactor current value IL_N, ΔIL_N.

Figure 8:
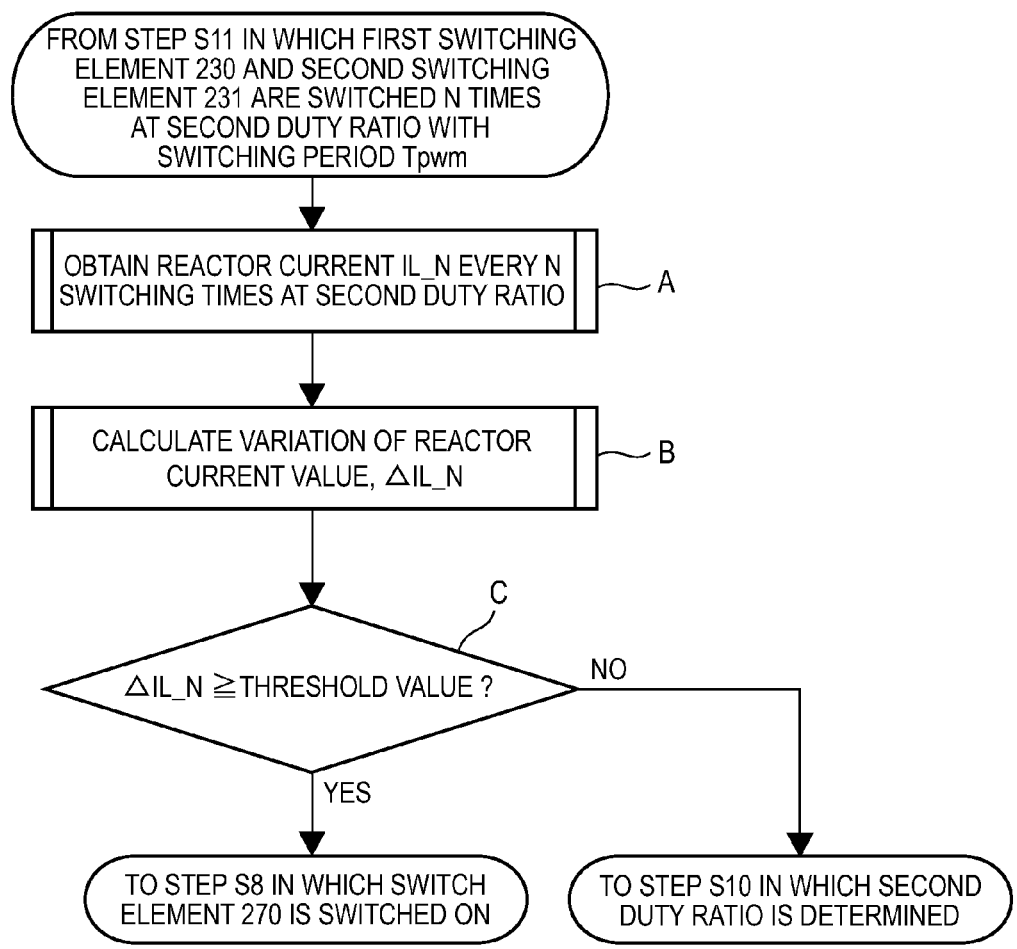
FIG. 8 is a flowchart depicting an operation of a vehicle power-supply unit according to a sixth embodiment of the invention.

In the sixth embodiment, Steps S12 and S13 of the second embodiment and the fourth embodiment above are replaced by Steps A, B, and C shown in FIG. 8.

In Step A, the reactor current value IL_N sampled when the switching is performed N times at the second duty ratio in Step S11 is obtained, and advancement is made to Step B.

In Step B, a variation ΔIL_N between the reactor current value IL_N obtained in Step A and the reactor current value IL_N of the last time is calculated, and advancement is made to Step C.

In Step C, a determination is made depending on the variation of the reactor current value IL, ΔIL_N, calculated in Step B. When the variation of the reactor current IL, ΔIL_N, is equal to or greater than a predetermined threshold value, advancement is made to the step in which the switch element 270 is controlled to switch ON from OFF. On the other hand, when the variation ΔIL_N is less than the predetermined threshold value, return is made to the step in which the second duty ratio is determined and the charging of the capacitor 260 is continued. When the charging voltage value Vco of the capacitor 260 exceeds a sum of the voltage value V2 of the second power supply 300 and a breakdown voltage value of the diode 271, a current flows into the second power supply 300 from the capacitor 260 via the diode 271. The reactor current rises temporarily due to the current flowing into the second power supply 300 from the capacitor 260. This rise is detected as the variation of the reactor current value IL_N, ΔIL_N. Whether the charging of the capacitor 260 is completed or not is determined by using the variation ΔIL_N as a threshold value on the basis of which a determination is made as to whether the charging of the capacitor 260 is completed.

In the sixth embodiment, by using the variation of the reactor current value IL_N, ΔIL_N, occurring when the reactor current flows in via the diode 271 as the threshold value on the basis of which the determination in the second embodiment and the fourth embodiment above is made as to whether the charging of the capacitor 260 to switch ON the switch element 270 is completed, a portion to detect the charging voltage of the capacitor 260 can be omitted. In addition, because the diode current detection portion 272 in the second embodiment and the fourth embodiment becomes unnecessary, too, the circuit scale and a processing load can be reduced.

Seventh Embodiment

A seventh embodiment will describe a predetermined threshold value of the charging voltage value Vco of the capacitor 260 on the basis of which the ON control is applied to the switch element 270 in Steps S7 and S14 of the first and third embodiments.

Herein, the charging voltage value Vco_init of the capacitor 260 in Step S7 or the predetermined threshold value of the charging voltage value Vco of the capacitor 260 in Step S14 is given as the voltage value V2 of the second power supply 300. When the charging voltage Vco_init of the capacitor 260 is equal to or greater than the voltage value V2 of the second power supply 300, it becomes possible to reduce a backflow current flowing into the capacitor 260 from the second power supply 300 when the switch element 270 is switched ON.

As has been described, in the seventh embodiment, by using the voltage value V2 of the second power supply 300 as the predetermined threshold value on the basis of which the ON control is applied to the switch element 270, it becomes possible to achieve soft start control by which a backflow current from the second power supply 300 when the switch element 270 is switched ON can be reduced.

Eighth Embodiment

An eighth embodiment will describe, as with the seventh embodiment above, the predetermined threshold value of the charging voltage value Vco of the capacitor 260 on the basis of which the ON control is applied to the switch element 270.

An inflowing current value Iin flowing into the capacitor 260 from the second power supply 300 at the instance the switch element 270 is switched ON is calculated in accordance with Equation (27) below on the basis of a difference ΔV2Vco between the voltage value V2 of the second power supply 300 and the charging voltage value Vco of the capacitor 260 and an ON resistance Rswitch across the switch element 270. By modifying Equation (27) below to an equation from which to calculate the charging voltage value Vco of the capacitor 260 by replacing the inflowing current value Iin with a maximum current value Iin_max that can be flown to the switch element 270, Equation (28) below can be obtained.

$$Iin = \Delta V2Vco \times Rswitch = (V2 - Vco) \times Rswitch \qquad \text{Equation (27)}$$

$$Vco = V2 - Iin\_max / Rswitch \qquad \text{Equation (28)}$$

By using the charging voltage value Vco of the capacitor 260 calculated in accordance with Equation (28) above as the predetermined threshold value on the basis of which the ON control is applied to the switch element 270, the switch element 270 can be switched ON faster than in the first and third embodiments above.

According to the eighth embodiment as described above, by using the threshold value calculated in accordance with Equation (28) above as the predetermined threshold value on the basis of which the ON control is applied to the switch element 270, the charging of the capacitor 260 is performed to satisfy the minimum requirement. Hence, the soft start can be finished quickly.

In the embodiments described above, the voltage transducer 200 uses the portions that detect the voltage value V1 of the first power supply 100 and the voltage value V2 of the second power supply 300. It should be appreciated, however, that the voltage values V1 and V2 detected by a generator or an engine controller, for example, an ECU, may be inputted into the control circuit 220 in the voltage transducer 200 via a communication means, such as CAN and LIN, and used in the voltage transducers 200 described in the first through eighth embodiments above.

The first through eighth embodiments above have described cases where the voltage transducer 200 is a step-down DC-to-DC converter or a step-up DC-to-DC converter. It should be appreciated, however, that the first through eighth embodiments can be combined. For example, in a case where the voltage transducer 200 is a step-up and a step-down DC-to-DC converters, the capacitor 260 is charged by the method described in the first and second embodiments. When the voltage value V1 of the first power supply 100 is reduced, the method described in the first and second embodiments is used intact. When the voltage value V1 of the first power supply 100 is increased, the voltage transducer 200 charges the capacitor 260 as the step-up DC-to-DC converter by the method described in the third and fourth embodiments above since the instant when the charging voltage value Vco of the capacitor 260 reaches a voltage value equal to the voltage value V1 of the first power supply 100. The switch element 270 is switched ON when the charging is completed so as to control the voltage value V2 of the second power supply 300 by increasing the voltage value V1 of the first power supply 100.

Various modifications and alterations of this invention will be apparent to those skilled in the art without departing from the scope and spirit of this invention, and it should be understood that this is not limited to the illustrative embodiments set forth herein.

What is claimed is:

1. A vehicle power-supply unit, comprising:
    a DC-to-DC converter with a chargeable and dischargeable first power supply connected to an input terminal and a chargeable and dischargeable second power supply connected to an output terminal and performing DC voltage transformation,
    wherein the converter includes at least two switching elements connected respectively between the input terminal and one end of a reactor and between the one end of the reactor and a ground and operated to switch by a control circuit; a capacitor connected between the other end of the reactor and the ground; and a switch element connected between the other end of the reactor and the output terminal, and
    wherein the control circuit performs a sampling to obtain a voltage at the input terminal, a voltage at the output terminal, and a reactor current flown through the reactor every certain number of switching times with a predetermined switching period with which the switching elements are operated; adjusts a duty ratio of the switching elements in synchronization with the sampling; controls the switching elements to operate the certain number of switching times at a first duty ratio determined according to a voltage value at the input terminal, an inductance value of the reactor, a predetermined current value outputted from the converter, the switching period, and the certain number of switching times and then estimates an initial charging voltage value preliminarily charged to the capacitor according to the reactor current value, the voltage value at the input terminal, the first duty ratio, and the inductance value; charges the capacitor while changing a second duty ratio, which is a voltage ratio of the initial charging voltage value and the voltage value at the input terminal, by a predetermined amount at a time and estimates a charging voltage value of the capacitor during charging of the capacitor according to the reactor current value, a capacity value of the capacitor, and the switching period; and applies ON control to the switch element when the charging voltage value of the capacitor reaches a predetermined threshold value.

2. The vehicle power-supply unit according to claim 1, wherein:
    the predetermined amount by which to change the second duty ratio is a predetermined amount determined on the basis of a reactor current obtained by the sampling with the predetermined current value outputted from the converter given as a target current value.

3. The vehicle power-supply unit according to claim 1 wherein:
    the reactor current obtained when a voltage value of the capacitor is estimated is an average current value of reactor currents in the predetermined switching period when the at least two switching elements are switched.

4. The vehicle power-supply unit according to claim 1, wherein:
    the predetermined threshold value of the charging voltage value of the capacitor is equal to or greater than the voltage value at the output terminal.

5. The vehicle power-supply unit according to claim 1, wherein:
    the predetermined threshold value of the charging voltage value of the capacitor is equal to or greater than a voltage value determined on the basis of a difference between the voltage value at the output terminal and the capacitor charging voltage value and an ON resistance across the switch element.

6. A vehicle power-supply unit, comprising:
    a DC-to-DC converter with a chargeable and dischargeable first power supply connected to an input terminal and a chargeable and dischargeable second power supply connected to an output terminal and performing DC voltage transformation,
    wherein the converter includes at least two switching elements connected respectively between the input terminal and one end of a reactor and between the one end of the reactor and a ground and operated to switch by a control circuit; a capacitor connected between the other end of the reactor and the ground; a switch element connected between the other end of the reactor and the output terminal; and a diode disposed so that an anode is on a side of the other end of the reactor and a cathode is on a side of the output terminal and connected in parallel with the switch element, and
    wherein the control circuit performs a sampling to obtain a voltage at the input terminal, a voltage at the output terminal, and a reactor current flown through the reactor every certain number of switching times with a predetermined switching period with which the switching elements are operated; adjusts a duty ratio of the switching elements in synchronization with the sampling; controls the switching elements to operate the certain number of switching times at a first duty ratio determined according to a voltage value at the input terminal, an inductance value of the reactor, a predetermined current value outputted from the converter, the switching period, and the certain number of switching times and then estimates an initial charging voltage value preliminarily charged to the capacitor according to the reactor current value, the voltage value at the input terminal, the first duty ratio, and the inductance value; charges the capacitor while changing a second duty ratio, which is a voltage ratio of the initial charging voltage value and the voltage value at the input terminal, by a predetermined amount at a time; and applies ON control to the switch element upon detection of a current flown from an anode side to a cathode side of the diode during charging of the capacitor.

7. The vehicle power-supply unit according to claim 6, wherein:
a current flown from the anode side to the cathode side of the diode connected in parallel with the switch element during the charging of the capacitor is detected according to a predetermined variation of the reactor current value.

8. A vehicle power-supply unit, comprising:
a DC-to-DC converter with a chargeable and dischargeable first power supply connected to an input terminal and a chargeable and dischargeable second power supply connected to an output terminal and performing DC voltage transformation,
wherein the converter includes a reactor connected to the input terminal at one end; a switch element connected to the output terminal at one end; at least two switching elements connected respectively between the other end of the reactor and a ground and between the other end of the reactor and the other end of the switch element and operated to switch by a control circuit; and a capacitor connected between a connection point of one of the switching elements and the switch element and the ground, and
wherein the control circuit performs a sampling to obtain a voltage at the input terminal, a voltage at the output terminal, and a reactor current flown through the reactor every certain number of switching times with a predetermined switching period with which the switching elements are operated; adjusts a duty ratio of the switching elements in synchronization with the sampling; controls the switching elements to operate the certain number of switching times at a first duty ratio determined according to a voltage value at the input terminal, an inductance value of the reactor, a predetermined current value outputted from the converter, the switching period, and the certain number of switching times and then estimates an initial charging voltage value preliminarily charged to the capacitor according to the reactor current value, the voltage value at the input terminal, the first duty ratio, and the inductance value; charges the capacitor while changing a second duty ratio, which is a voltage ratio of the initial charging voltage value and the voltage value at the input terminal, by a predetermined amount at a time and estimates a charging voltage value of the capacitor during charging of the capacitor according to the reactor current value, a capacity value of the capacitor, and the switching period; and applies ON control to the switch element when the charging voltage value of the capacitor reaches a predetermined threshold value.

9. A vehicle power-supply unit, comprising:
a DC-to-DC converter with a chargeable and dischargeable first power supply connected to an input terminal and a chargeable and dischargeable second power supply connected to an output terminal and performing DC voltage transformation,
wherein the converter includes a reactor connected to the input terminal at one end; a switch element connected to the output terminal at one end; at least two switching elements connected respectively between the other end of the reactor and a ground and between the other end of the reactor and the other end of the switch element and operated to switch by a control circuit; a capacitor connected between a connection point of one of the switching elements and the switch element and the ground; and a diode disposed so that an anode is on a side of the switching elements and a cathode is on a side of the output terminal and connected in parallel with the switch element, and
wherein the control circuit performs a sampling to obtain a voltage at the input terminal, a voltage at the output terminal, and a reactor current flown through the reactor every certain number of switching times with a predetermined switching period with which the switching elements are operated; adjusts a duty ratio of the switching elements in synchronization with the sampling; controls the switching elements to operate the certain number of switching times at a first duty ratio determined according to a voltage value at the input terminal, an inductance value of the reactor, a predetermined current value outputted from the converter, the switching period, and the certain number of switching times and then estimates an initial charging voltage value preliminarily charged to the capacitor according to the reactor current value, the voltage value at the input terminal, the first duty ratio, and the inductance value; charges the capacitor while changing a second duty ratio, which is a voltage ratio of the initial charging voltage value and the voltage value at the input terminal, by a predetermined amount at a time; and applies ON control to the switch element upon detection a current flown from an anode side to a cathode side of the diode during charging of the capacitor.

* * * * *